United States Patent

Kuznets et al.

[11] Patent Number: 5,700,214
[45] Date of Patent: Dec. 23, 1997

[54] HYDRAULIC TENSIONER WITH LOCKING MECHANISM

[75] Inventors: Sam A. Kuznets, Burdett; John Mortellaro, Jr., Ithaca, both of N.Y.

[73] Assignee: Borg-Warner Automotive, Inc., Sterling Heights, Mich.

[21] Appl. No.: 618,966

[22] Filed: Mar. 20, 1996

[51] Int. Cl.$^6$ ............................................. F16H 7/08
[52] U.S. Cl. ............................................. 474/110
[58] Field of Search ............................ 474/101, 110, 474/111, 136

[56] References Cited

U.S. PATENT DOCUMENTS

| 4,772,251 | 9/1988 | Goppelt et al. | 474/101 |
| 4,792,322 | 12/1988 | Goppelt et al. | 474/136 |
| 4,911,680 | 3/1990 | Kodama et al. | 474/136 |
| 4,940,447 | 7/1990 | Kawashima et al. | 474/110 |
| 4,985,009 | 1/1991 | Schmidt et al. | 474/101 |

FOREIGN PATENT DOCUMENTS

| 58-38189 | 8/1983 | Japan . |
| 3-35355 | 4/1991 | Japan . |

*Primary Examiner*—Roger J. Schoeppel
*Attorney, Agent, or Firm*—Hugh A. Abrams, Esq.; Greg Dziegielewski, Esq.

[57] ABSTRACT

A hydraulic chain tensioner has a locking mechanism that includes three grooves and a ring located along the body of the piston. The ring sits partially within each of the first and second grooves to lock the piston into shipping position and completely within the third groove during operation of the tensioner.

6 Claims, 3 Drawing Sheets

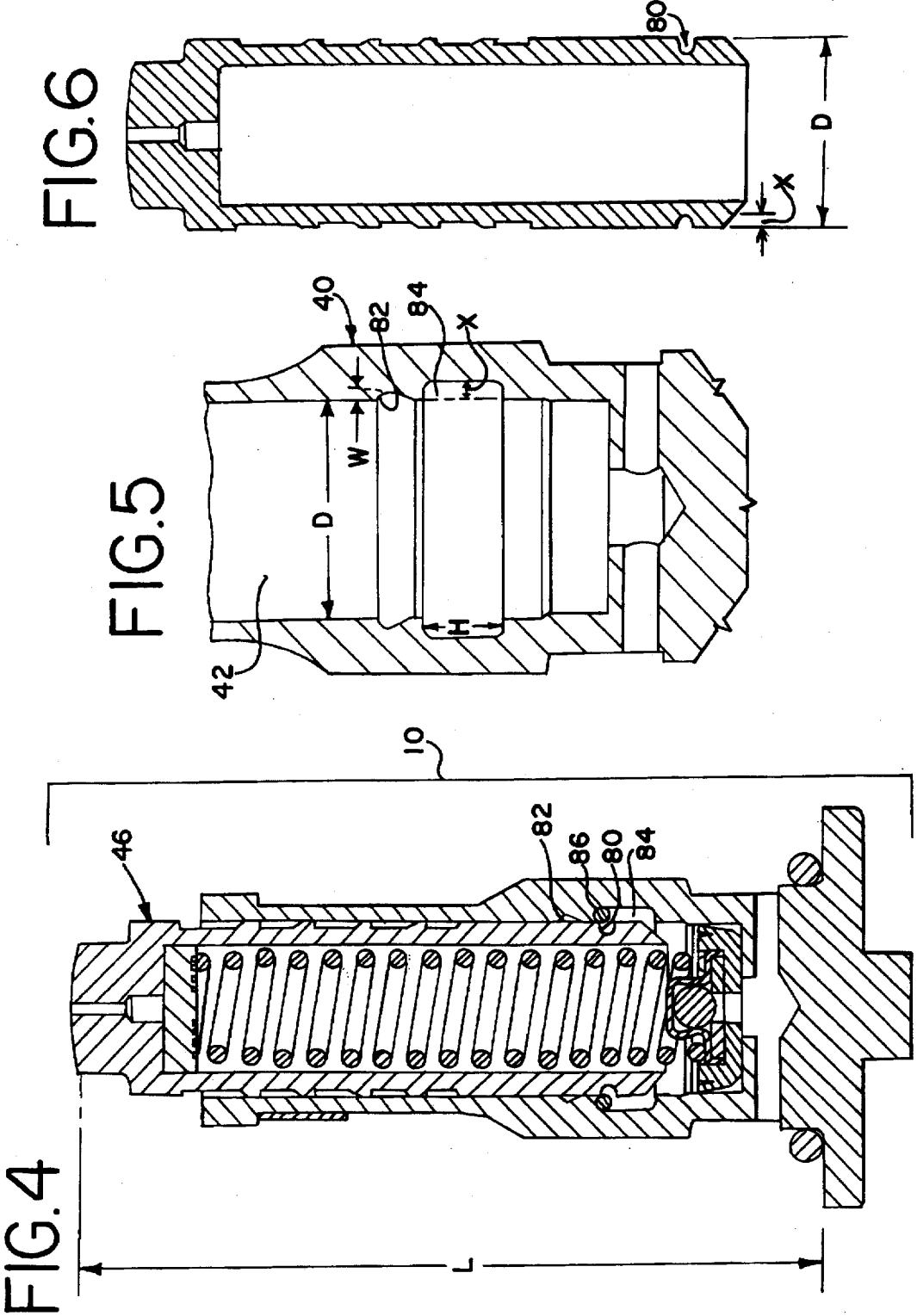

HYDRAULIC TENSIONER WITH LOCKING MECHANISM

BACKGROUND OF THE INVENTION

This invention relates generally to a hydraulic chain tensioner having a piston longitudinally movable in a housing and more particularly to a locking mechanism for the piston of such a tensioner. Specifically, the locking mechanism includes a first groove that is cut into the outside of the piston body, second and third grooves that are cut into the tensioner body and a ring located along the body of the piston that is slidably received within the grooves. The locking mechanism maintains the piston in a stationary position during transit and installation.

Tensioning devices, such as hydraulic tensioners, are used as control devices for power transmission chains as the chains travel between a plurality of sprockets. A typical prior art tensioner includes a housing having a bore, which forms a fluid chamber with a hollow piston. The chamber, which is preferably a cylindrical bore, slidably receives the hollow piston. The chamber is filled with fluid through a passageway extending from a pressure fluid source. The fluid source may be an oil pump, oil reservoir or the like. A check valve is positioned between the chamber and the passageway, and thus the source of fluid pressure, to permit fluid flow into the chamber while blocking fluid flow in the reverse direction. The check valve may be a ball-type check valve, a spring valve, or a variable orifice check valve. A spring contacts the inside of the end of the piston to bias the piston, and hence the tensioner face, in an outward direction.

During shipment and installation, the piston has a tendency to slide in and out of the bore. Typically, prior art tensioners have used external clips to prevent the piston from extending or protruding during shipping and installation. External clips not only increase the size of the tensioner, but also mean that the clips must be pulled off and disposed of after installation. Other prior art tensioners, such as those described in Japanese Publication Nos. 58-38189 and 3-35355, employ a hook and projection system wherein the hook engages the projection in order to retain the piston inside the housing.

The locking mechanism of the present invention is a simple and inexpensive replacement for external clips and hook and projection systems. The locking mechanism is also a simple and inexpensive way of holding the piston in place and preventing it from extending or protruding during shipping and installation. The advantage of the present invention is that there are no clips that need to be pulled off and thrown away prior to operation.

SUMMARY OF THE INVENTION

The present invention is directed to a hydraulic tensioner having a locking mechanism that holds the piston in place during shipment and installation of the tensioner. The tensioner includes a housing having a bore and a hollow piston slidably received within the bore to form a fluid-filled chamber. A locking mechanism is provided to prevent movement of the piston during shipment and installation. The locking mechanism preferably includes three grooves, the first cut into the body of the piston and the second and third cut into the tensioner body. The first and second grooves work together to hold the piston in its locked position. A ring is located along the body of the piston. The ring, which is preferably a wire ring, is adapted to sit partially in the first and second grooves to lock the piston into position for shipment and installation and to sit completely within the third groove during operation of the tensioner. The third groove is deeper and longer than both the first groove and the second groove and can accept up to four rings so that the tensioner can be reset several times without removing the previous rings.

The tensioner of the present invention can be either a primary or a secondary tensioner. In its preferred embodiment, the present invention is a primary tensioner.

The foregoing and other features and advantages of the present invention will become apparent from the following detailed description of the presently preferred embodiments and the accompanying drawings.

BRIEF DESCRIPTION OF THE DRAWINGS

FIG. 4 is a schematic illustrating a hydraulic tensioner incorporating the locking mechanism of the present invention in its free position.

FIG. 5 is a schematic illustrating the housing and the bore of the presently preferred embodiment of the hydraulic tensioner of the present invention.

FIG. 6 is a schematic illustrating the piston of the presently preferred embodiment of the hydraulic tensioner of the present invention.

DETAILED DESCRIPTION OF THE INVENTION AND PRESENTLY PREFERRED EMBODIMENTS

Figure 1:
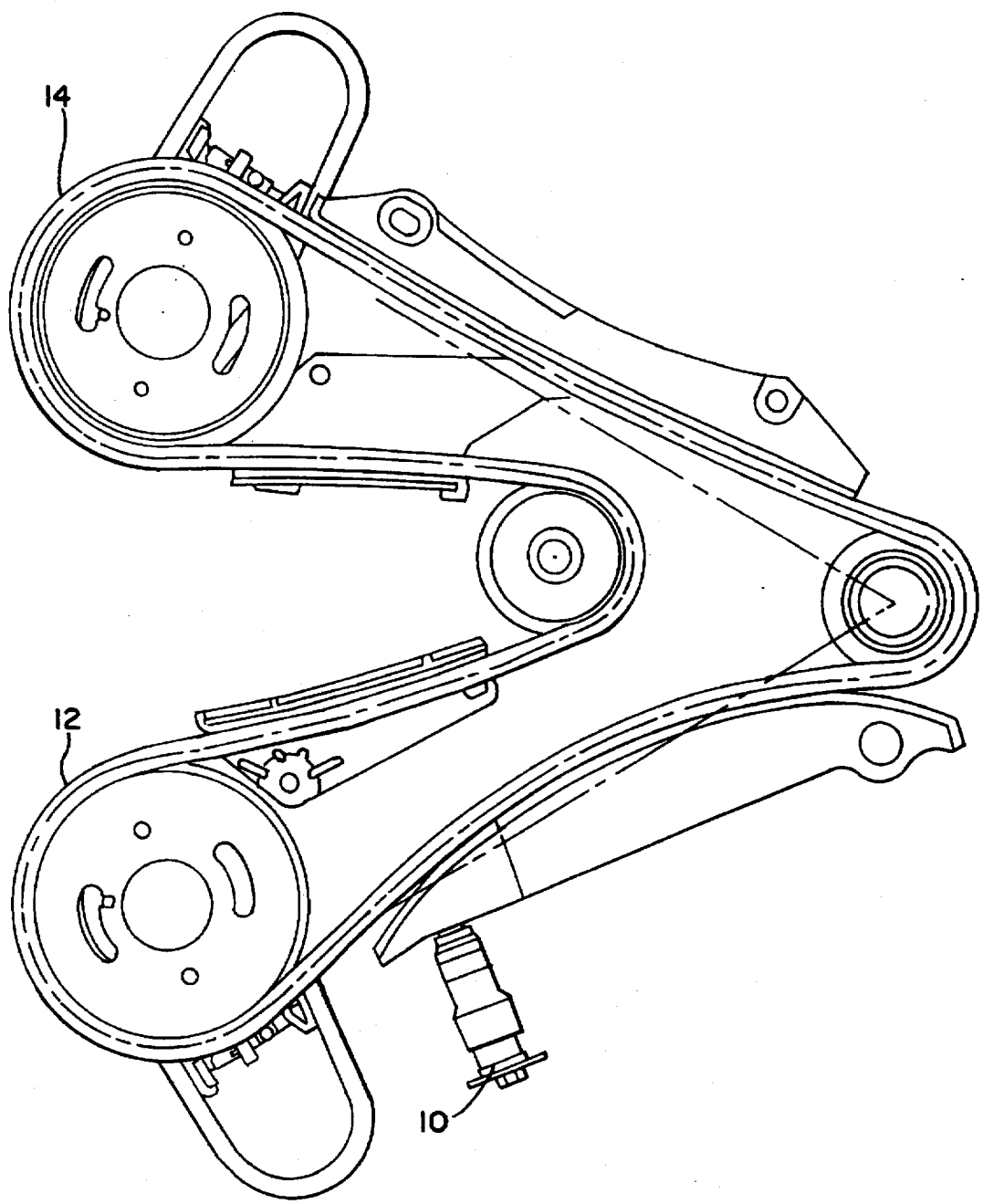
FIG. 1 is a schematic illustrating a hydraulic tensioner incorporating the locking mechanism of the present invention in an engine timing system.

Turning now to the drawings, FIG. 1 illustrates a hydraulic tensioner 10 positioned in an engine timing system. The timing system includes overhead camshafts 12 and 14. The tensioner of the present invention is not limited to any particular timing system.

Figure 2:
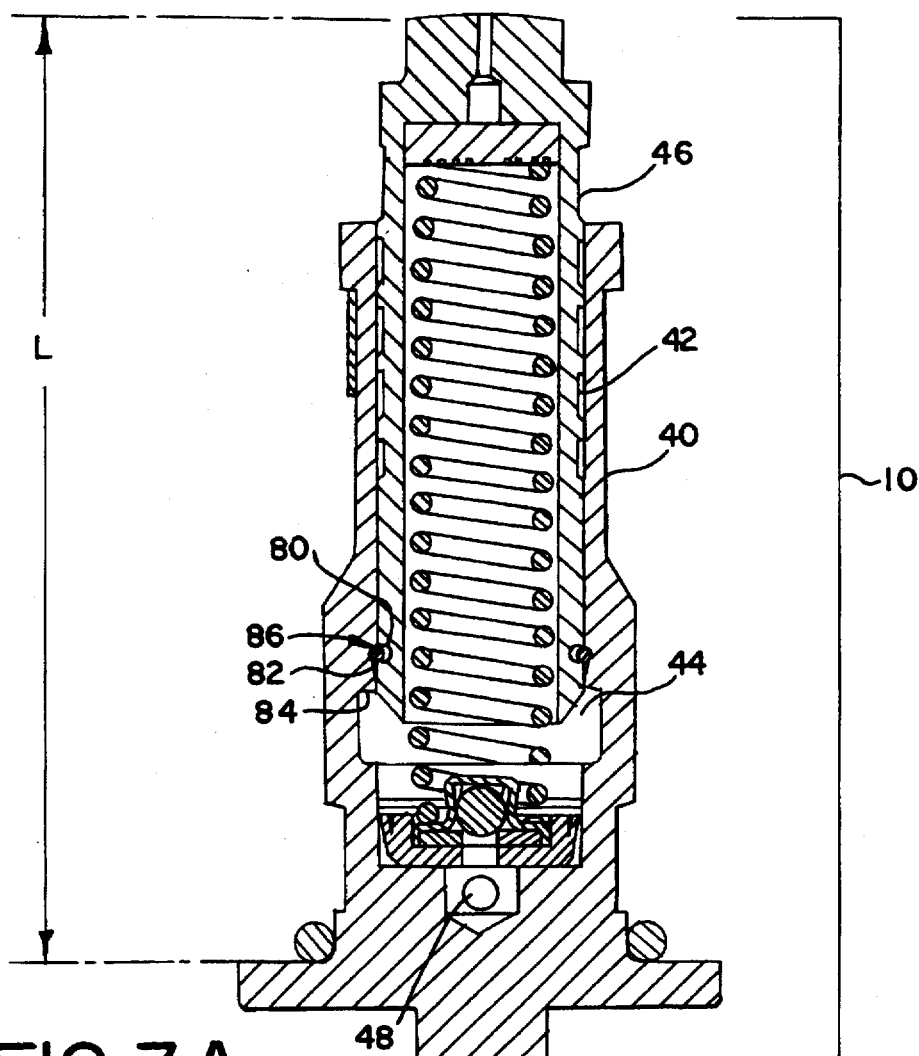
FIG. 2 is a schematic illustrating a hydraulic tensioner incorporating the locking mechanism of the present invention in its position for shipping and installation.
Figure 3A:
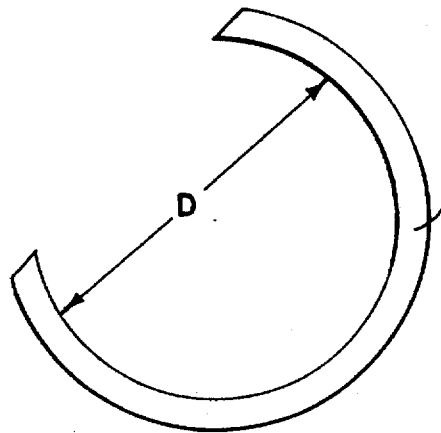
FIG. 3A is a top view of the retainer ring used in the present invention.
Figure 3B:
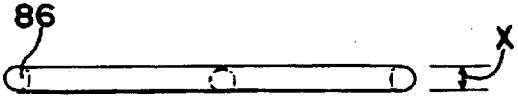
FIG. 3B is a side view of the retainer ring used in the present invention.

FIG. 2 illustrates the hydraulic chain tensioner 10 of FIG. 1 incorporating the locking mechanism of the present invention in its shipping and installation position. The tensioner 10 includes a housing 40 having a bore 42 that forms a fluid chamber 44 with a hollow piston 46. The chamber 44 is designed to slidably receive the hollow piston 46. Fluid enters the chamber 44 formed by the bore 42 and hollow piston 46 through a passageway 48 from a pressure fluid source (not shown). The fluid source may be an oil pump, oil reservoir or the like. A first groove 80, a second groove 82, a third groove 84 and a retainer ring 86 are used to prevent the tensioner 10 from protruding or extending during shipment and installation. The first groove 80 is cut into the body of the piston 46. The second groove 82, which is shallower than the first groove 80, is cut into the body of the tensioner 10. The third groove 84 is also cut into the body of the tensioner 10. The ring 86, a schematic of which is shown in FIG. 3, is located along the body of the piston 46 inside of the chamber 44. The third groove 84 is designed to accept up to four rings (only one of which is shown).

To operate the locking mechanism of the present invention and hold the piston 46 in the shipping position, the piston 46 is pushed into the chamber 44 until the ring 86 snaps into both first groove 80 and the second groove 82. Grooves 80 and 82 are designed such that the ring 86 is seated partially within both the first groove 80 and the second groove 82. Once seated within grooves 80 and 82, the ring 86 holds the piston 46 in place and prevents it from protruding or extending during shipment and installation.

Once the tensioner incorporating the locking mechanism of the present invention is installed into an automotive timing system, the piston 46 is released from the locked position by pushing the piston further inward such that the ring 86 snaps out of grooves 80 and 82 and travels along the piston until it reaches the third groove 84. As shown in FIG. 4, upon reaching the third groove 84, which is deeper than first groove 80 and second groove 82, the ring 86 sits completely within the third groove 84 and permits movement of the piston 46 during operation of the tensioner 10.

FIGS. 5 and 6 illustrate the presently preferred embodiment of the claimed invention. Referring first to FIG. 5, there is shown the housing 40 and the bore 42 of the hydraulic tensioner incorporating the locking mechanism of the present invention. The bore 42 preferably has a nominal diameter D of about 16.013 millimeters. The second groove 82, which is cut into the housing 40, angles inwardly to provide a catch for the ring 86. The second groove 82 preferably has a depth W of about 0.668 millimeters. Also cut into the housing 40 is the third groove 84. The third groove 84, which has a cylindrical shape, preferably has a depth X of about 1.298 millimeters. The height H of the third groove 84 is preferably at least four times the thickness of the retainer ring 86, or about 5.60 millimeters.

Referring now to FIG. 6, there is shown the piston 46 of the hydraulic tensioner incorporating the locking mechanism of the present invention. The piston 46 preferably has an outside diameter D of about 15.97 millimeters. The first groove 80, which is cut into the body of the piston 46, preferably has a depth X of about 1,085 millimeters. The retainer ring 86, shown in FIG. 3, preferably has an inner diameter D of from about 16.80 millimeters to about 17.00 millimeters and a thickness X of about 1.117 millimeters.

Referring back to FIG. 2, when in the shipping position, the length L of the tensioner is preferably about 72.29 millimeters. When the tensioner 10 is in the free position, as shown in FIG. 4, its length L is preferably about 68.23 millimeters.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A hydraulic chain tensioner comprising:

a housing having a generally cylindrical bore;

a hollow piston slidably received within said bore to define a fluid chamber with said bore;

a spring biasing the piston in the protruding direction from said bore;

a first groove formed in the outside of said piston;

a second groove and a third groove each formed in said housing; and a retainer ring located along said piston, application of external force to said piston being effective to move said piston inward to a first locked position having said ring in both said first groove and said second groove and restricting further movement of said piston, and application of additional external force to said piston being effective to move said piston inward to a second position to release said ring into said third groove, said ring in said third groove being radially outward of said piston to permit unrestricted movement of said piston.

2. The tensioner of claim 1 wherein said ring is generally circular in shape.

3. The tensioner of claim 1 wherein said first groove has a first depth, said second groove has a second depth, said third groove has a third depth, said third depth being greater than said first depth and second depth.

4. The tensioner of claim 1 wherein said ring is positioned completely in said third groove during operation of said tensioner.

5. The tensioner of claim 1 wherein said third groove has a height in the axial direction of said piston, said height sufficient to accommodate four rings.

6. A method of using a locking mechanism in a hydraulic tensioner, said tensioner having a housing, a bore, a hollow piston slidably received within said bore to define a fluid chamber with said bore, a spring biasing the piston in the protruding direction from said bore, a first groove formed in the outside of said piston, a second groove and a third groove each formed in said housing and a retainer ring, comprising the steps of:

pushing said piston inward into said bore into a locked position in which said ring is positioned partially in each of said first and second grooves; and releasing said piston from the locked position by pushing said piston further into said bore until said ring is positioned radially outward of said piston in said third groove to permit unrestricted movement of said piston.

* * * * *